US012691377B2

(12) United States Patent
Kurz et al.

(10) Patent No.: US 12,691,377 B2
(45) Date of Patent: Jul. 28, 2026

(54) SYSTEMS, METHODS, AND APPARATUS FOR QUANTIFYING NEURO-MUSCULAR POWER

(71) Applicant: Father Flanagan's Boys' Home, Omaha, NE (US)

(72) Inventors: Max Kurz, Boys Town, NE (US); Brad Corr, Boys Town, NE (US); Sarah Baker, Boys Town, NE (US)

(73) Assignee: Father Flanagan's Boys' Home, Omaha, NE (US)

( * ) Notice: Subject to any disclaimer, the term of this patent is extended or adjusted under 35 U.S.C. 154(b) by 638 days.

(21) Appl. No.: 17/935,180

(22) Filed: Sep. 26, 2022

(65) Prior Publication Data

US 2023/0321527 A1 Oct. 12, 2023

Related U.S. Application Data

(60) Provisional application No. 63/261,682, filed on Sep. 27, 2021.

(51) Int. Cl.
*A63F 13/285* (2014.01)
*G06F 3/01* (2006.01)

(52) U.S. Cl.
CPC ............ *A63F 13/285* (2014.09); *G06F 3/016* (2013.01)

(58) Field of Classification Search
CPC ........... A63F 13/285; A63B 2024/0068; A63B 21/062; A63B 21/068; A63B 21/4029; A63B 2208/0252; A63B 2220/30; A63B 2220/52; A63B 2225/20; A63B 2225/50;
A63B 2230/10; A63B 23/03525; A63B 23/0405; A63B 24/0062; A63B 71/0622; G06F 3/015; G06F 3/016
See application file for complete search history.

(56) References Cited

U.S. PATENT DOCUMENTS 6,231,481 B1 * 5/2001 Brock ................. A63B 21/072
                                             482/8
2008/0248926 A1 * 10/2008 Cole ..................... A63B 24/00
                                             482/5
2009/0221928 A1 * 9/2009 Einav ................. A61B 5/4076
                                             601/5

(Continued)

OTHER PUBLICATIONS

Moreau et al., "Differential adaptations of muscle architecture to high-velocity versus traditional strength training in cerebral palsy," Neurorehabilitation Neural Repair, Jan. 4, 2013, vol. 27, No. 4, pp. 325-334.

*Primary Examiner* — Tameem D Siddiquee
(74) *Attorney, Agent, or Firm* — McKee, Voorhees & Sease, PLC

(57) ABSTRACT

Green light therapy includes the showing of results of training in real time. This has been shown to increase the overall output and efficacy of the training regimen using the equipment. A sensor and programming are used with different training equipment for training, rehabilitation, or muscle building exercises for use with neuromuscular disorders to provide the real time feedback to the user of the equipment. The feedback will aid in obtaining the desired output by the user and to attempt to maintain the desired output throughout the training session. Thus, the feedback can help improve the results of the training for user.

17 Claims, 4 Drawing Sheets
(4 of 4 Drawing Sheet(s) Filed in Color)

(56)         References Cited

U.S. PATENT DOCUMENTS

| | | | |
|---|---|---|---|
| 2009/0292178 A1* | 11/2009 | Ellis | G16H 10/60 |
| | | | 600/301 |
| 2011/0152033 A1* | 6/2011 | Yang | A63B 71/0622 |
| | | | 482/8 |
| 2017/0197106 A1* | 7/2017 | Dalebout | A63B 23/12 |
| 2019/0159715 A1* | 5/2019 | Mishra Ramanathan | |
| | | | A61B 5/4088 |

* cited by examiner

SYSTEMS, METHODS, AND APPARATUS FOR QUANTIFYING NEURO-MUSCULAR POWER

CROSS REFERENCE TO RELATED APPLICATIONS

This application claims priority under 35 U.S.C. § 119 to provisional patent application U.S. Ser. No. 63/261,682, filed Sep. 27, 2021. The provisional patent application is herein incorporated by reference in its entirety, including without limitation, the specification, claims, and abstract, as well as any figures, tables, appendices, or drawings thereof.

FIELD OF THE INVENTION

The invention relates generally to a system, apparatus, and/or corresponding method of use in at least the areas of physical therapy and general physical training. More particularly, but not exclusively, the invention relates to systems that provide feedback in training, such as power training, to provide awareness and increase the efficiency of the training for participants, including those with neurological issues and/or conditions.

BACKGROUND OF THE INVENTION

Different types of training are used for a variety of reasons. Casual training provides health benefits for participants on a general manner with respect to the areas of treatment. Athletic or other specialty training provides feedback for more specific tasks and are focused on providing improvement and peak results for more specific tasks. Thus, they are focused on more specific areas of the body. Additional training can be directed towards areas of need, such as rehabilitation for an injury or the treatment of a disorder, such as a neuromuscular disorder. Examples of such disorders include, but are not limited to, cerebral palsy, stroke, multiple sclerosis and the like.

For example, over 90% of youth with cerebral palsy (CP) have mobility difficulties due to excessive muscular co-contractions, poor strength, impaired motor control, and/or the presence of joint contractures. These youth are faced with the lifelong challenge of finding effective medical treatments that will allow them to overcome these neuro-muscular deficits and improve the likelihood that they will achieve independence in their communities. Historically, the term "cerebral palsy" indicated weakness (i.e., palsy) caused by the brain (i.e., cerebral). Based on this notion, a large body of the clinical literature has focused on the use of strength training as a means for improving the mobility. The premise for this treatment approach has been supported by studies that have shown youth with CP have muscular weakness, with the musculoskeletal architecture being comprised of shorter muscle fibrils and reduced cross-sectional area. Yet, the strength training results for individuals with CP have been mixed with several clinical trials showing minimal improvements in functional walking tasks or no change at all. The consensus is that although many youth with CP may lack strength, maximal strength is not necessary to perform many activities of daily living. Over the past decade, the modern therapeutic approaches for treating the mobility impairments seen in adolescents with CP have recognized this shortcoming and have switched from primarily focusing on the musculoskeletal system (i.e., strength, flexibility), towards approaches that place greater emphasis on the neurological deficiencies (i.e., motor planning, sensory processing). Despite the revised clinical direction, there are a limited number of therapeutic approaches to date that are considered to be "green light" therapies for motor function. Examples of such green light therapies include those which provide feedback so that a participant actually sees the results of the therapies in real time. Green light therapies have robust data to shown that they have a high probability of resulting in clinically relevant improvements and should be implemented.

Therapeutic power training has emerged a treatment approach that has the potential to achieve the green light status. This approach involves the production of rapid sub-maximal muscular contractions, whereas traditional strength training involves heavier loads moved at slower velocities. The rapid motor actions promote earlier activation of the muscles and increased maximal firing rate, conceivably leading to better functional mobility compared to strength training. The few studies that have employed therapeutic power-training have shown that youth with CP demonstrate larger mobility improvements than what is seen for strength training, and these improvements are accompanied by beneficial changes in the musculoskeletal architecture. Remarkably, no consideration has been given to the potential neuroplastic changes seen in the nervous system. It is possible that the therapeutic power training constructs might enhance of the brain plans/executes a motor action. These potential beneficial neuroplastic changes might exceed the beneficial plasticity that has been reported at the muscular level. That being said, power training prescriptions might lack sufficient fidelity to be translated to the clinic. For one, the well catalogued sensory deficits seen in youth with CP would likely impact the knowledge of the motor performance and ability for a patient to perceive if they are sufficiently moving at a fast speed. Secondarily, the treating therapist likely struggles to accurately quantity if the patient's motor action was performed with enough speed to meet the treatment guidelines. These combined factors have the potential to result in the power-training therapeutic prescription being more like strength training as opposed to the intended high-velocity motor action, which would have a high probability of not resulting in clinically relevant improvements. Altogether these factors impact the rigor of the treatment approach and represent a substantial barrier for therapeutic power training being able to achieve the green light status.

Thus, there exists a need in the art for a system, method, and/or associated apparatus that can be used in therapeutic power training and that includes the green light therapy approaches to provide feedback to increase the responsiveness and results of the training.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage to includes systems for training apparatuses that provides feedback to the users of the apparatuses. The feedback can include desired ranges for outputs to help aid the use of the apparatus.

It is still yet a further object, feature, and/or advantage to provide an apparatus to provide real time biofeedback showing the performance of the use of a training apparatus/device. The feedback could include targets for a user to attempt to stay within the desired training range.

It is yet another object, feature, and/or advantage to provide a system, method, and/or apparatus that provides feedback in the form of therapeutic velocity for the use of a training apparatus to attempt to promote power training.

The system, apparatus, and/or accompanying method of use disclosed herein can be used in a wide variety of applications. For example, new or existing training apparatus could be outfitted with aspects of the invention to provide the desired feedback in a number of locations, including, but not limited to, gyms, rehab centers, physical therapy locations, clinics, sports training facilities, gyms, or even in a person's home.

It is preferred the apparatus be safe, cost effective, and durable. For example, the components of the apparatus/system should be easily adaptable for existing training equipment and capable of movement and excess forces.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of an apparatus which accomplish some or all of the previously stated objectives.

The apparatus and/or system can be incorporated into systems which accomplish some or all of the previously stated objectives. This includes new or existing training equipment.

According to some aspects of the present disclosure, a system for providing feedback during the use of training equipment comprises a sensor electronically coupled to the training equipment, said sensor configured to calculate a power output associated with a movement of a component of the training equipment; and a display showing the calculated power output in real time to a user of the training equipment, wherein said display further shows a target power output along with the calculated power output.

According to at some aspects of some embodiments, the sensor measures a linear velocity associated with the movement of the component of the training equipment, and wherein the calculated power output is based, in part, by the measured linear velocity.

According to at some aspects of some embodiments, the calculated power output is further based on a displacement, a total load, and an angle associated with the moveable component of the training equipment.

According to at some aspects of some embodiments, the training equipment comprises a slidable leg press.

According to at some aspects of some embodiments, the sensor comprises a linear position transducer.

According to at some aspects of some embodiments, the display comprises a screen with a graphical user interface.

According to at some aspects of some embodiments, the calculated power output and the target power output are shown on a common graph of the graphical user interface.

According to at some aspects of some embodiments, the system further comprises a machine-user interface connected to the sensor and the display to enter one or more of the target power output, a load associated with the training equipment, and an angle associated with the training equipment.

According to additional aspects and/or embodiments, a method for evaluating training by a user with a training equipment comprises sensing, with a sensor, an aspect of a movement of the training equipment by the user; calculating, based in part by the sensed movement, a power output of the user using the training equipment; displaying, in real time, the calculated power output of the user using the training equipment on a display; and comparing, on the display, the calculated power output of the user using the training equipment with a target power output in real time.

According to at some aspects of some embodiments, the method further comprises inputting the target power output to the display prior based upon user information.

According to at some aspects of some embodiments, the step of calculating the power output comprises the use of measured velocity of the movement of the training equipment.

According to at some aspects of some embodiments, the method further comprises using a measured displacement, total load, and angle associated with the training equipment to calculate the power output.

According to at some aspects of some embodiments, the training equipment comprises a leg press with a slidable component, and wherein the velocity and measure displacement are associated with the movement of the slidable component.

According to at some aspects of some embodiments, the slidable component and the user comprise the total load.

According to at some aspects of some embodiments, the display is a screen, and the calculated power output and the target power output are shown graphically on the screen together to provide feedback to the user.

According to at some aspects of some embodiments, the method further comprises measuring neural activity of the user during use of the training equipment.

According to additional aspects and/or embodiments, a training system comprises a training equipment comprising a component movable in a generally linear manner: a sensor coupled to the training equipment, the sensor configured to: measure one or more aspects of the movable component of the training equipment; and calculate a power output associated with the movement of the component, the power output based, in part, on the one or more measured aspects; a display in communication with the training equipment and sensor to display, in real time, the calculated power output and to display the calculated power output along with a target power output.

According to at some aspects of some embodiments, the one or more measured aspects of the movable component comprise a velocity, a total load, a displacement, or a geometry of the movable component of the training equipment.

According to at some aspects of some embodiments, the training equipment comprises a leg press.

According to at some aspects of some embodiments, the calculated power output comprises leg power production.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a)

combinations of disclosed aspects and/or embodiments and/or (b) reasonable modifications not shown or described.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Several embodiments in which the invention can be practiced are illustrated and described in detail, wherein like reference characters represent like components throughout the several views. The drawings are presented for exemplary purposes and may not be to scale unless otherwise indicated.

Figures 1A, 1B, 1C:
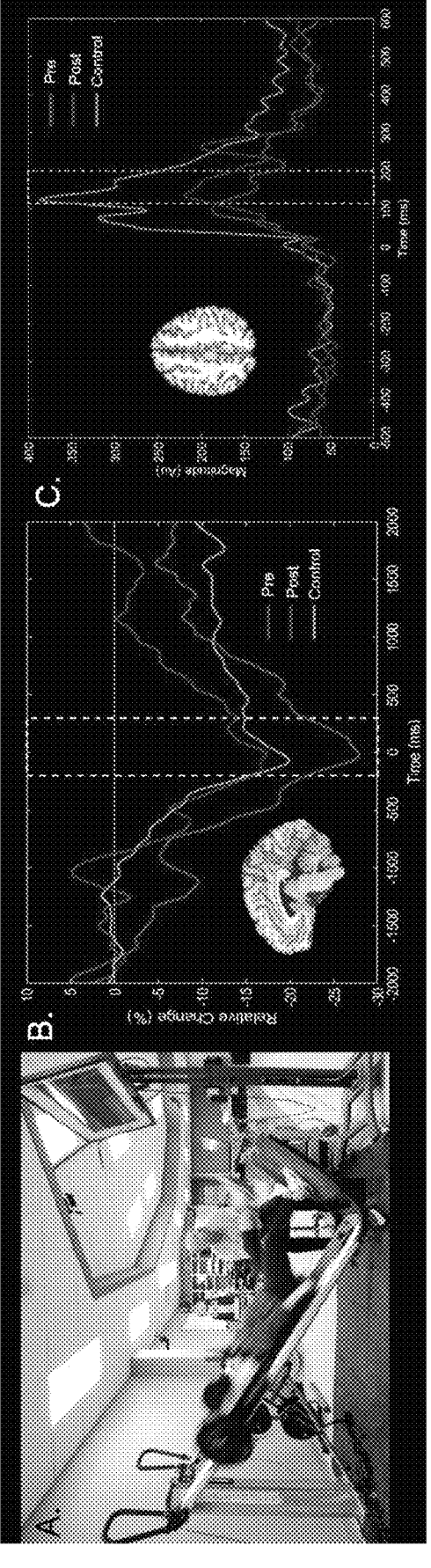
FIG. 1A shows an exemplary depiction of a participant undergoing our therapeutic power training protocol while feedback on the leg power production is displayed on a monitor in real-time from our custom-built device.
FIG. 1B shows a graph of grand-averaged brain images. The displayed neural activity time courses were extracted from the motor areas of the brain. The green trace is the average neural activity for the controls, the red time course is the average response for youth with CP prior to the power training, while the blue time course is the average response after the training. Time (milliseconds—"ms") is denoted on the x-axis, with 0 ms defined as the movement onset. Inspection of the neural time courses reveals that the youth with CP had altered activity in the brain areas that control the leg prior to the power training, and that the activity became more like the controls after training.
FIG. 1C shows grand-averaged brain image of the activity of the brain that processes sensory information. The displayed neural time courses were extracted from the area of the brain that processes sensory information. The green trace is the average neural time course for the controls, the red time course is the average response for youth with CP prior to the power training, while the blue time course is the average response after the training. Time (ms) is denoted on the x-axis, with 0 ms defined as the onset of the sensory stimulus. Inspection of the neural time courses reveals that the youth with CP had weaker somatosensory activity prior to the power training and that the somatosensory activity was stronger after training.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

As will be understood, aspects and/or embodiments included in the present disclosure are related to green light therapies. Green light therapies are those where you actually see results in the therapy. In addition, it is to be understood that the invention, including any of the aspects of any of the embodiments disclosed, could be used in a number of manners and for a number of reasons. The systems described can be add-on or retro components that are used with existing training equipment. Training equipment is to be considered generally any type of equipment used to train, treat, improve, rehab, or otherwise be used in conjunction with a user for physical training. Furthermore, the location of the training should not be limited, and it is envisioned that the training equipment can be generally anywhere, including, but not limited to, homes, gyms, offices, clinics, rehabilitation centers, doctor's offices, hospitals, and anywhere else that training equipment can be found. Still further, the systems, components, kits, etc., which are disclosed herein can be included and integrated with new training equipment, such that the training equipment is fitted and manufactured with the components and/or systems described. Finally, it is envisioned that the components and/or systems included herein could be used on their own, such as part of a wearable device or technology and connected to a feedback device to provide the advantages found with training equipment.

Again, the use of the equipment could be for a number of uses and/or benefits. As will be understood, aspects and/or embodiments of that disclosed herein can be used for strength training, physical training, rehabilitation, muscular disorders, illnesses, casual training, or any other type of training.

For example, therapy power training is one type of training that is used to treat muscular and/or neurological disorders, such as cerebral palsy (CP) or stroke. The type of training could be used for all ages, including children. Power training typically involves exercises which apply the maximum amount of force as fast as possible; on the basis that strength+speed=power. As noted, therapeutic power training has emerged a treatment approach that has the potential to achieve the green light status. This approach involves the production of rapid submaximal muscular contractions, whereas traditional strength training involves heavier loads moved at slower velocities. The rapid motor actions promote earlier activation of the muscles and increased maximal firing rate, conceivably leading to better functional mobility compared to strength training. The few studies that have employed therapeutic power-training have shown that youth with CP demonstrate larger mobility improvements than what is seen for strength training, and these improvements are accompanied by beneficial changes in the musculoskeletal architecture. Remarkably, no consideration has been given to the potential neuroplastic changes seen in the nervous system. It is possible that the therapeutic power training constructs might enhance of the brain plans/executes a motor action. These potential beneficial neuroplastic changes might exceed the beneficial plasticity that has been reported at the muscular level. That being said, power training prescriptions might lack sufficient fidelity to be translated to the clinic. For one, the well catalogued sensory deficits seen in youth with CP would likely impact the knowledge of the motor performance and ability for a patient to perceive if they are sufficiently moving at a fast speed. Secondarily, the treating therapist likely struggles to accurately quantity if the patient's motor action was performed with enough speed to meet the treatment guidelines. These combined factors have the potential to result in the power-training therapeutic prescription being more like strength training as opposed to the intended high-velocity motor action, which would have a high probability of not resulting in clinically relevant improvements. Altogether these factors impact the rigor of the treatment approach and represent a substantial barrier for therapeutic power training being able to achieve the green light status.

One of the issues associated with power training is making sure that the training is maintained within the desired and/or prescribed velocity in order to make sure that the training is actually considered power training. It can be difficult for one to know if they are in the threshold for power training, or if they are simply strength training.

Therefore, according to at least some aspects of some embodiments of the present disclosure, a display in the form of feedback is in operable combination with a piece of training equipment. The feedback display provides information related to power training in order to show the user if they are within the power training parameters. This feedback provides data that is used by the person using the training equipment to make any necessary changes to be within the power training parameters.

For example, FIG. 1A shows an exemplary depiction of a participant undergoing our therapeutic power training protocol while feedback on the leg power production is displayed on a monitor in real-time from our custom-built device. The training equipment/device in FIG. 1A is a leg press, in which a user places their feet on a foot pedal and lays at an angle relative to the ground. Their back is on a movable mat that can be equipped with additional weights, wherein the weight of the user, the sliding mat, and the additional weight comprise the total load. With their legs flexed at an angle, a user trains by extending their legs. To be within the power training, it is the speed and/or velocity of the sliding mat that is measured to be within the desired parameters. However, other types of leg presses, such as when a user lays on a substantially static mat with their legs at an angle against a movable press that can be equipped with additional weights, could also be used. Still further, generally any type of training equipment used with power training could be used as part of the disclosure.

A sensor, such as a linear cable transducer, is incorporated with the movable part of the training equipment. The sensor is used to detect the velocity of the movable sled portion of the training equipment. A linear transducer is a type of position sensor. Linear transducers measure linear displacement or movement along a single axis in any direction. They do this by converting the movement into an electrical signal which is proportional to the displacement so that it can be processed by various devices. Linear transducers can take different forms, including, but not limited to, potentiometers, non-contact type, or cable extension transducers.

Additional sensors, such as those used to calculate a load (e.g., weight), could also be used and included in any of the aspects of any of the embodiments as disclosed herein. The load, along with the velocity, can be used as part of a power algorithm/equation to determine a calculated power output, as will be disclosed.

To provide the feedback to a user of the training equipment, a display is shown in FIG. 1A. The display is a type of user interface showing information, such as the speed, power output, desired power output, and/or any other data associated with the use of the training equipment and/or exercise(s). A user interface is how the user interacts with a machine. The user interface can be a digital interface, a command-line interface, a graphical user interface ("GUI"), oral interface, virtual reality interface, or any other way a user can interact with a machine (user-machine interface). For example, the user interface ("UI") can include a combination of digital and analog input and/or output devices or any other type of UI input/output device required to achieve a desired level of control and monitoring for a device. Examples of input and/or output devices include computer mice, keyboards, touchscreens, knobs, dials, switches, buttons, speakers, microphones, LIDAR, RADAR, etc. Input(s) received from the UI can then be sent to a microcontroller to control operational aspects of a device.

The user interface module can include a display, which can act as an input and/or output device. More particularly, the display can be a liquid crystal display ("LCD"), a light-emitting diode ("LED") display, an organic LED ("OLED") display, an electroluminescent display ("ELD"), a surface-conduction electron emitter display ("SED"), a field-emission display ("FED"), a thin-film transistor ("TFT") LCD, a bistable cholesteric reflective display (i.e., e-paper), etc. The user interface also can be configured with a microcontroller to display conditions or data associated with the main device in real-time or substantially real-time.

As shown in FIG. 1A, the display is in the form of a television, such as an LED television. The television is connected to the sensor and training equipment in order to provide the feedback to the user.

The sensor can be connected to the display in a number of ways, including wired or wirelessly. If wired, the components could be connected via any known wired manner, including Ethernet. Ethernet is a family of computer networking technologies commonly used in local area networks ("LAN"), metropolitan area networks ("MAN") and wide area networks ("WAN"). Systems communicating over Ethernet divide a stream of data into shorter pieces called frames. Each frame contains source and destination addresses, and error-checking data so that damaged frames can be detected and discarded; most often, higher-layer protocols trigger retransmission of lost frames. As per the OSI model, Ethernet provides services up to and including the data link layer. Ethernet was first standardized under the Institute of Electrical and Electronics Engineers ("IEEE") 802.3 working group/collection of IEEE standards produced by the working group defining the physical layer and data link layer's media access control ("MAC") of wired Ethernet. Ethernet has since been refined to support higher bit rates, a greater number of nodes, and longer link distances, but retains much backward compatibility. Ethernet has industrial application and interworks well with Wi-Fi. The Internet Protocol ("IP") is commonly carried over Ethernet and so it is considered one of the key technologies that make up the Internet.

For wireless connections, a network can be used to communicate information between the sensor, training equipment, and display. In some embodiments, the network is, by way of example only, a wide area network ("WAN") such as a TCP/IP based network or a cellular network, a local area network ("LAN"), a neighborhood area network ("NAN"), a home area network ("HAN"), or a personal area network ("PAN") employing any of a variety of communication protocols, such as Wi-Fi, Bluetooth, ZigBee, near field communication ("NFC"), etc., although other types of networks are possible and are contemplated herein. The network typically allows communication between the communications module and the central location during moments of low-quality connections. Communications through the network can be protected using one or more encryption techniques, such as those techniques provided by the Advanced Encryption Standard (AES), which superseded the Data Encryption Standard (DES), the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

For example, the wired connections can be set up for more permanent or semi-permanent applications, where a display device such as a television or monitor are positioned in a manner for a user to see. In such situations where the device/system is to be portable, the display can be a handheld, such as a tablet, phone, or the like. This can be done in a wired or wireless manner, so as to provide greater flexibility for the system. This would allow an operator (trainer, physical therapist, doctor, other user) to quickly set up the system with any power training equipment in any location to provide the benefits thereto.

Still further, the sensor, display, or other location includes a processor, such as include an intelligent control (i.e., a controller) and components for establishing communications. Examples of such a controller may be processing units alone or other subcomponents of computing devices. The controller can also include other components and can be implemented partially or entirely on a semiconductor (e.g., a field-programmable gate array ("FPGA")) chip, such as a chip developed through a register transfer level ("RTL") design process.

A processing unit, also called a processor, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, handheld devices, laptops, user displays, smart devices (TV, speaker, watch, etc.), and other computing devices.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

Figure 4:
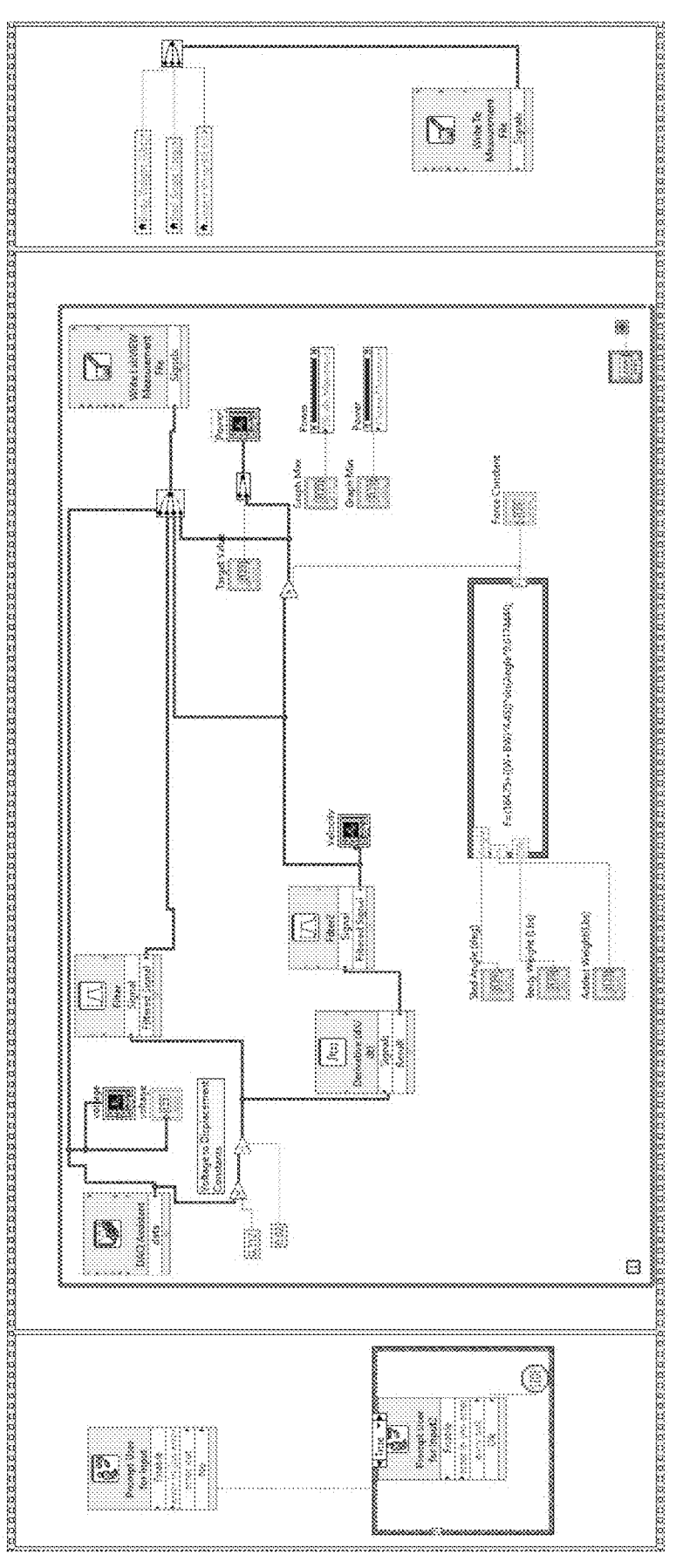
FIG. 4 shows an exemplary power algorithm for use with systems according to aspects and/or embodiments of the present disclosure.

The processor and/or modules can include memory, algorithms, databases, and the like, which can improve aspects of the invention. For example, a power algorithm is used with the system including some or all of the components disclosed, with the power algorithm providing the calculated power output obtained by the user of the training equipment. FIG. 4 is an example of a power algorithm according to at least some aspects of the disclosure.

The results, as well as any of the databases, algorithms, etc., could be stored on or include a memory. The memory includes, in some embodiments, a program storage area and/or data storage area. The memory can comprise read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

Still further, the system could include aspects of cloud environments, where the systems, applications, algorithms, or data are stored in a cloud environment, and which can be accessed via a cloud network.

As shown in FIG. 4, the exemplary power algorithm includes "Voltage to Displacement Constants". The data acquisition (DAQ) application is used in algorithm shown, which for exemplary purposes, was created in LabVIEW. The DAQ Assistant is an easy-to-use graphical interface for configuring measurement tasks and channels and for customizing timing, triggering, and scales without programming. Using the DAQ Assistant, you can configure a measurement task for all of your DAQ applications and then generate code to configure and use the task in your application program. A task is a collection of one or more virtual channels with timing, triggering, and other properties. Conceptually, a task represents a measurement or generation you want to perform.

A filtered signal application is included to filter out any unwanted signals/noise from the algorithm.

In addition, the algorithm is set up to determine/measure velocity, which is shown by the Derivative application, where velocity is shown to be the derivative of position with respect to time. A second filter application is included to filter out noise, with the result giving you the velocity, as shown by the Velocity application.

A "Force Constant" is determined using the equation: F=(164.75+((W+BW)*4.45))*sin(Angle*0.0174444), where W=Added Weight (weight added to the training equipment), BW=Body Weight of the user, B+BW=total load, and Angle=Sled Angle, which is the angle that the sled is angled to move relative to the horizontal. This results in the Force Constant, which is used with the algorithm.

As Power=Force*Velocity, the determined Force Constant and measured Velocity. This will give you the Power (e.g., in Watts (W)). In addition, the algorithm shows including a Target Value for target power, and Graph Max and Graph Min, which are parameters for the displayed power. At the "Write LabVIEW Measurement File", the algorithm is set up to save the performance data to a file and/or cloud-based storage system. This same data will be shown, for example, on a graph, wherein the user will be able to view the calculated power and target power as feedback. They can then change their training or aspects thereof to attempt to be within the parameters of the target power output, which is indicative of power training. The target power can be set to reach the goals/parameters of power training and can vary from person to person.

Example 1

A preliminary investigation was conducted to explore the potential changes that occur in the brain after youth with CP (N=11; Age=15.9+1.1 yrs.; GMFCS levels I-III) underwent 8 weeks (3 times a week for 24 sessions) of the therapeutic power training protocol that was performed on a Total Gym system (FIG. 1A). Pre and post brain imaging was used to assess the extent of the neuroplastic changes seen in the key motor areas of the brain. The neural time courses seen at baseline (before therapy) were aligned with prior investigations that have shown that brain activity in the motor areas is altered in the youth with CP when compared with the controls (CP=−25.9±1.8%; NT=−17.2±3.6%, p=0.04). However, after undergoing the therapeutic power training protocol as shown and described herein, the participants with CP had a substantial improvement in the brain areas that control the leg movements (pre=−25.9±1.8%, post=−14.8±3.6%, p=0.02; FIG. 1B). Furthermore, the brain activity became similar to what was seen in the controls (p=0.68).

FIG. 1B shows grand-averaged brain images. The displayed neural activity time courses were extracted from the motor areas of the brain. The green trace is the average neural activity for the controls, the red time course is the average response for youth with CP prior to the power training, while the blue time course is the average response after the training. Time (ms) is denoted on the x-axis, with 0 ms defined as the movement onset. Inspection of the neural time courses reveals that the youth with CP had altered activity in the brain areas that control the leg prior to the power training, and that the activity became more like the controls after training.

Changes in the brain areas were also imaged that are involved in the processing of sensory information. The neural time courses seen at baseline (before therapeutic power-training) were also aligned with prior investigations that have shown that the activity of the areas of the brain that process sensory information were weaker for the youth with CP compared with controls (NT=323.53±71.15, CP Pre=136.78, ±46.45, P=0.02). Remarkably, the activity of the areas of the brain that process sensory information vastly improved after the youth with CP completed the therapeutic power training (CP Pre=136.79±27.45, CP Post=199.98±46.45, P=0.02; FIG. 1C).

As shown, FIG. 1C shows grand-averaged brain image of the activity of the brain that processes sensory information. The displayed neural time courses were extracted from the area of the brain that processes sensory information. The green trace is the average neural time course for the controls, the red time course is the average response for youth with CP prior to the power training, while the blue time course is the average response after the training. Time (ms) is denoted on the x-axis, with 0 ms defined as the onset of the sensory stimulus. Inspection of the neural time courses reveals that the youth with CP had weaker somatosensory activity prior to the power training and that the somatosensory activity was stronger after training.

The preliminary results also showed that the patients with CP had a 56.3% improvement in their one-rep maximum (1 RM) (Pre=158.27+24.7 kg; Post=247.53+41 kg; P=0.002), a 32.8% improvement in their peak leg power production (Pre=509.8+64.7 W, Post=677.1+113 W; P=0.03), and 5% improvement in the distance they could walk in 1-minute walk (Pre=77.4±9.2 m, Post=80.8±8.4 m, p=0.03). Lastly, the leg peak power production after the therapeutic power training was tightly linked with the amount of change seen in the motor areas of the brain (r=0.79, P=0.03), implying that improvements in leg power production were associated with greater neuroplastic changes. Altogether these preliminary results strongly suggest that the therapeutic protocol as shown and described herein has the potential to results in clinically relevant improvements that are accompanied by beneficial neuroplastic changes in the brains of youth with CP.

Example 2

Figure 2:
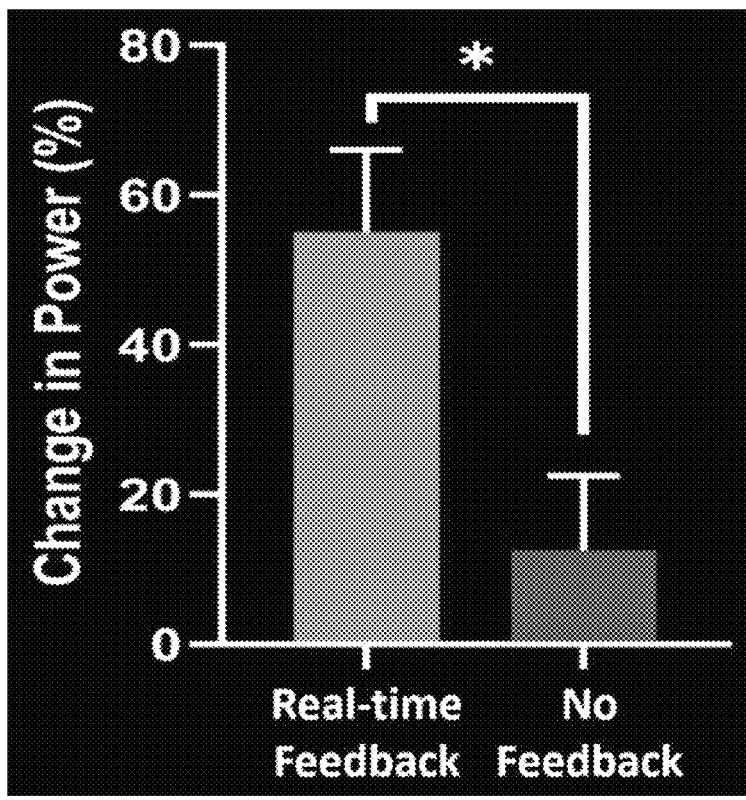
FIG. 2 shows pre-post percent change in the lower extremity leg-press power production. As shown, the group of participants that received the real-time feedback about their leg power production during the therapy had a markedly larger improvement in their power production than those that did not receive the feedback.

As previously stated, the translation of the therapeutic power training results into the clinics across the United States poses a significant challenge as youth with CP have limited experience with high-velocity based movements, and physical therapists can struggle to judge if the youths are moving with sufficient speed to meet the treatment guidelines. Recognizing these pitfalls, the device and/or system as shown and described provides real-time biofeedback of the participant's leg power production. A new group of youth with CP (N=17; Age=17.0±4.1 yrs., GMFCS I-IV) were randomly assigned to either perform the power training with real-time feedback (FB) of their leg power production or to perform the therapy without feedback (NFB). The Total Gym was instrumented with a custom-built linear transducer system that was used to calculate the leg power production in real-time, and we displayed the calculated power on a monitor that could be viewed concurrently by the physical therapist and the patient (FIG. 1A). Furthermore, the custom-software enabled the therapist to set target power production levels on the feedback screen. These targets enabled the therapist and the patient to gauge if the patient was meeting the power prescription. Once again, both groups underwent 24 (8 weeks; 3 days-a-week) leg press power training sessions. The results showed that both groups had similar changes in their leg-press 1 RM (VFB=49.8±7.60%; NFB=53.6±9.21%; P=0.787), suggesting that either approach resulted in muscular strength gains. Amazingly, the visual feedback greatly enhanced the leg power production. Change in the peak power production of the group that received the feedback was 78% greater than the group that received no feedback (FB=55.0±11%; NFB=12.5±10%; P=0.02; FIG. 2). This suggests that knowledge of the performance for the physical therapist and the patient is an important key ingredient for ensuring the optimal challenge point and motor performance is achieved. More importantly, the results suggest that larger neuroplastic changes are likely ignited with our biofeedback device. This implies that the device and/or system of the present disclosure is likely a green light therapy that promotes beneficial changes in the brain.

As shown, FIG. 2 shows pre-post percent change in the lower extremity leg-press power production. As shown, the group of participants that received the real-time feedback about their leg power production during the therapy had a markedly larger improvement in their power production than those that did not receive the feedback.

Example 3

A high-velocity leg press power training sessions instrumented with a custom-built linear transducer system that measured movement velocity in real-time. Intensity: 40-80% of the 1-repetition maximum (1 RM). 6 sets of 5 maximum-effort repetitions "as-fast-as-possible", both unilaterally and bilaterally. Duration:24 Sessions (3 days-a-week; 8 weeks). The groups were split into two:

Visual Feedback Group (VFB): velocity of the leg press performance displayed on a monitor with target velocity.

No Visual Feedback Group (NFB): no visual feedback provided to supplement therapists' instruction.

Figure 3:
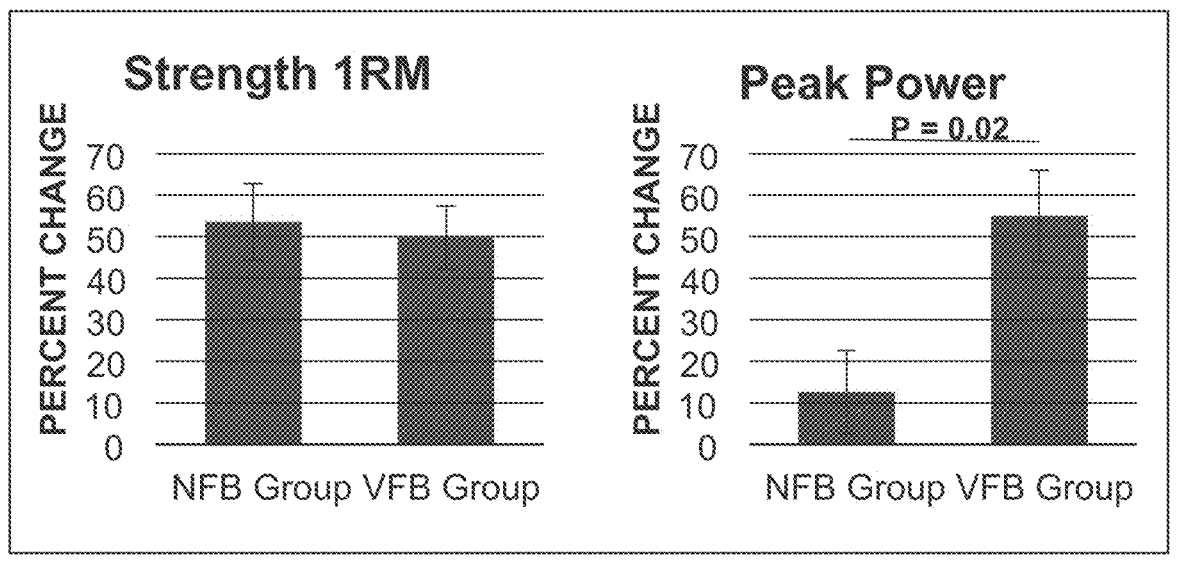
FIGS. 3A and 3B are graphs showing (A) the percent change in strength for a 1-repetition maximum (1 RM) for a visual feedback group (VFB) and a no visual feedback group (NFB); and (B) the percent change in peak power for a visual feedback group (VFB) and a no visual feedback group (NFB).

The results of the study are shown in FIG. 3, which shows that visual feedback greatly enhanced peak power output of the users. Therefore, knowledge of velocity for the participant and therapist during power training is a key ingredient for ensuring optimal challenge and teaching power production to adolescents and adults with CP.

Example 4

Purpose/Hypothesis: Individuals with CP have substantial deficits in the brain's ability to control the lower extremity (LE) muscle power, which impact daily activity and walking ability to a greater extent than muscle weakness. There are few, if any, clinically feasible and precise measures of LE muscle power that are appropriate for those with CP. Given the functional significance of LE muscle power in CP, reliable and precise measures of muscle power are needed. The purpose of this study is to determine the reliability and minimal detectable change (MDC) of a novel power leg press test to measure LE muscle power in individuals with CP.

Subjects: Twenty-four ambulatory individuals (GMFCS I: n=4, II: n=17, III: n=3) with spastic CP (Mean age 19.1+/−7.8 yrs; range 10-37 yrs).

Materials/Methods: Participants performed 2 test sessions of 5 power leg presses at 40-50% of their 1-repetition maximum separated by 2-10 days on an inclined leg press. The concentric phase was performed "as fast as possible" starting at 90 degrees of knee flexion and ending with full knee extension. Displacement, total load, and angle of the leg press were used to calculate mean and peak power in watts (W) for each trial using a linear position transducer and a computer. The average and maximum of 5 trials for mean and peak power were recorded. Within session and between session reliability was evaluated using intraclass correlation coefficient (ICC). MDC was calculated from the standard error of measurement (SEM). MDC percentage (% MDC) was used to compare relative error between the 4 power measures by dividing the MDC by the group mean.

Results: Test-retest reliability was excellent for average and maximum mean (ICC=0.981, 0.958) and peak power (ICC=0.989, 0.977) and excellent for within session reliability for mean and peak power measures (ICC=0.960, 0.970). The SEM and MDCs were 12.96 W and 35.9 W for average mean power (% MDC=21.1%), 20.8 W and 57.6 W for maximum mean power (% MDC=30.2%), 19.4 W and 53.8 W for average peak power (% MDC=15.3%), and 29.95 W and 83.02 W for maximum peak power (% MDC=21.4%).

Conclusions: Reliability was excellent for test-retest and within session reliability for mean and peak power during the novel power leg press test. Despite the heterogeneity in individuals with CP reflected in our sample with regards to age and GMFCS levels, MDCs were acceptable for all power measures, except for maximum mean power. Averaging trials improved the reliability and precision of measurement of mean and peak power. Average peak power was the most precise measure of LE power because it had the lowest % MDC with changes of only 15% needed to reflect true change.

Clinical Relevance: Reliable and precise measures of LE muscle power may enhance clinical exercise prescription and assessment of outcomes in individuals with CP. These findings will aid clinicians and researchers in determining whether a change in a power leg press test can be attributed to true changes in muscle performance following resistance training interventions. Average peak power is the most reliable and precise measurement of muscle power produced during a power leg press activity for individuals with CP.

From the foregoing, it can be seen that the invention accomplishes at least all of the stated objectives. As included, the devices, kits, systems, and methods disclosed utility therapeutic velocity of training and feedback in a displayed manner to aid users in obtaining and maintaining power training. The system can be retrofit to existing equipment or could be installed as part of the equipment. In addition, the feedback could be wirelessly communicated to a device, such as a handheld device, to provide more flexibility to the user to be able to see the feedback display.

The invention claimed is:

1. A system for providing feedback during the use of training equipment, comprising:

a sensor electronically coupled to the training equipment, said sensor configured to calculate a power training output associated with a movement of a component of the training equipment;

a display showing the calculated power training output in real time to a user of the training equipment, wherein said display further shows a target power training output along with the calculated power training output; and a device measuring neural activity from motor areas of the brain of the user during use of the training equipment;

wherein the sensor measures a linear velocity associated with the movement of the component of the training equipment, and wherein the calculated power training output is based, in part, by the measured linear velocity; and wherein the measured neural activity during use of the training equipment is compared to a post-training neural activity to determine an improvement of the calculated power training output.

2. The system of claim 1, wherein the calculated power training output is further based on a displacement, a total load, and an angle associated with the moveable component of the training equipment.

3. The system of claim 1, wherein the training equipment comprises a slidable leg press.

4. The system of claim 1, wherein the sensor comprises a linear position transducer.

5. The system of claim 1, wherein the display comprises a screen with a graphical user interface.

6. The system of claim 5, wherein the calculated power training output and the target power training output are shown on a common graph of the graphical user interface.

7. The system of claim 6, further comprising a machine-user interface connected to the sensor and the display to enter one or more of the target power training output, a load associated with the training equipment, and an angle associated with the training equipment.

8. A method for evaluating training by a user with a training equipment, the method comprising:

sensing, with a sensor, an aspect of a movement of the training equipment by the user;

calculating, based in part by the sensed movement, a power training output of the user using the training equipment;

displaying, in real time, the calculated power training output of the user using the training equipment on a display;

comparing, on the display, the calculated power training output of the user using the training equipment with a target power training output in real time; and measuring neural activity from motor areas of the brain of the user during use of the training equipment;

wherein the step of calculating the power training output comprises the use of measured velocity of the movement of the training equipment; and wherein the measured neural activity during use of the training equipment is compared to a post-training neural activity to determine an improvement of the calculated power training output.

9. The method of claim 8, further comprising inputting the target power training output to the display based upon user information.

10. The method of claim 9, further comprising using a measured displacement, total load, and angle associated with the training equipment to calculate the power training output.

11. The method of claim 10, wherein the training equipment comprises a leg press with a slidable component, and wherein the velocity and measure displacement are associated with the movement of the slidable component.

12. The method of claim 11, wherein the slidable component and the user comprise the total load.

13. The method of claim 8, wherein the display is a screen, and the calculated power training output and the target power training output are shown graphically on the screen together to provide feedback to the user.

14. A training system, comprising:

a training equipment comprising a component movable in a generally linear manner:

a sensor coupled to the training equipment, the sensor configured to:

measure one or more aspects of the movable component of the training equipment; and calculate a power training output associated with the movement of the component, the power training output based, in part, on the one or more measured aspects;

a display in communication with the training equipment and sensor to display, in real time, the calculated power training output and to display the calculated power training output along with a target power output; and a device measuring neural activity from motor areas of the brain of the user during use of the training equipment;

wherein the one or more measured aspects of the movable component comprise a velocity; and wherein the measured neural activity during use of the training equipment is compared to a post-training neural activity to determine an improvement of the calculated power training output.

15. The training system of claim 14, wherein the one or more measured aspects of the movable component additionally comprise a total load, a displacement, or a geometry of the movable component of the training equipment.

16. The training system of claim 14, wherein the training equipment comprises a leg press.

17. The training system of claim 14, wherein the calculated power training output comprises leg power production.

* * * * *